(12) United States Patent
Shen et al.

(10) Patent No.: US 11,215,695 B2
(45) Date of Patent: Jan. 4, 2022

(54) ON-BOARD RADAR CALIBRATION DEVICE

(71) Applicant: AUTEL INTELLIGENT TECHNOLOGY CORP., LTD., Guangdong (CN)

(72) Inventors: Zhiqin Shen, Guangdong (CN); Xiaolong Wang, Guangdong (CN); Jin Chen, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 16/926,274

(22) Filed: Jul. 10, 2020

(65) Prior Publication Data

US 2020/0341113 A1    Oct. 29, 2020

Related U.S. Application Data

(63) Continuation of application No. PCT/CN2019/070776, filed on Jan. 8, 2019.

(30) Foreign Application Priority Data

Jan. 12, 2018  (CN) .......................... 201810031836.6

(51) Int. Cl.
    *G01S 7/40*    (2006.01)
(52) U.S. Cl.
    CPC .................. *G01S 7/4021* (2013.01)
(58) Field of Classification Search
    None
    See application file for complete search history.

(56) References Cited

U.S. PATENT DOCUMENTS

| 6,031,508 | A | 2/2000 | Ishizuka et al. |
| 6,363,619 | B1* | 4/2002 | Schirmer .............. G01S 7/4026 33/288 |
| 2019/0187249 | A1* | 6/2019 | Harmer ................ F16M 11/242 |

FOREIGN PATENT DOCUMENTS

| CN | 106405526 A | 2/2017 |
| CN | 206321785 U | 7/2017 |

(Continued)

OTHER PUBLICATIONS

International Search Report dated Apr. 8, 2019; PCT/CN2019/070776.

*Primary Examiner* — Whitney Moore

(57) ABSTRACT

The present invention relates to the technical field of automobile maintenance and device calibration, discloses an on-board radar calibration device, the on-board radar calibration device including a laser-corner reflecting apparatus. The laser-corner reflecting apparatus includes a laser and a corner reflector, the corner reflector being mounted to the laser. The laser is configured to emit a laser, so as to calibrate positions of the corner reflector and an on-board radar. The corner reflector is configured to reflect a radar wave emitted by the on-board radar, so that the radar wave returns along an original path, to calibrate an installation angle of the on-board radar. In the present invention, the corner reflector and the on-board radar may be calibrated using the laser, and then the on-board may be calibrated using the corner reflector, without the help of other calibration apparatuses, simplifying operations for calibrating the on-board radar.

21 Claims, 13 Drawing Sheets

(56) References Cited

FOREIGN PATENT DOCUMENTS

| | | |
|---|---|---|
| CN | 206832984 U | 1/2018 |
| CN | 107966690 A | 4/2018 |
| CN | 207924130 U | 9/2018 |

* cited by examiner

ON-BOARD RADAR CALIBRATION DEVICE

The application is a continuation of International Patent Application No. PCT/CN2019/070776 filed on Jan. 8, 2019, which claims Chinese Patent No. 201810031836.6 filed on Jan. 12, 2018, both of which are incorporated herein by reference in their entireties.

BACKGROUND

Technical Field

The present invention relates to the technical field of vehicle maintenance and device calibration, and in particular, to an on-board radar calibration device.

Related Art

In the field of advanced driver assistant systems (ADAS), an adaptive cruise control (ACC) system is a commonly used assistant function. A specific working principle of the adaptive cruise control system is measuring a distance from a front vehicle using an on-board radar, comparing a speed of the vehicle to a speed of the vehicle ahead, and controlling power systems such as an accelerator and a braking system of the vehicle, so that the vehicle is kept at a constant safety distance from the front vehicle. Therefore, a function of the on-board radar is of vital importance to implementation of the ACC function. In addition to measurement performance of the radar, an installation position and an installation angle thereof determine correctness and accuracy of final measurement data thereof. The foregoing installation position and installation angle change due to uncontrollable factors such as vibration and collision caused by use of the vehicle. Therefore, in the field of vehicle maintenance and device calibration, especially for calibration of the ACC function, calibration of the on-board radar is core content. At present, calibration of the on-board radar is mostly after-loading calibration. In other words, after a vehicle is delivered from a factory to a user in use for a period, the on-board radar is required to be calibrated due to an objective reason.

During implementation of the present invention, an inventor finds that one calibration tool is mainly a single vehicle type calibration tool, that is, one calibration tool can be only used to calibrate an on-board radar of a single vehicle type. In addition, a calibration method excessively depends on software to calculate a deviation angle, and can be implemented through repeated calibration for a plurality of times, which is complex and inconvenient for use.

SUMMARY

In order to resolve the foregoing technical problems, embodiments of the present invention provide an on-board radar calibration device with simple calibration operations.

In the embodiments of the present invention, the technical problems are resolved using the following technical solutions.

An on-board radar calibration device includes a laser-corner reflecting apparatus, the laser-corner reflecting apparatus including a laser and a corner reflector, and the corner reflector being mounted to the laser. The laser is configured to emit a laser, so as to calibrate positions of the corner reflector and an on-board radar. The corner reflector is configured to reflect a radar wave emitted by the on-board radar, so that the radar wave returns along an original path, to calibrate an angle of mounting the on-board radar.

Optionally, the laser includes a round emitting hole; the corner reflector includes a corner reflecting plate, the corner reflecting plate being an isosceles triangle plate, angle sides of the three corner reflecting plates being connected to each other, vertexes of vertex angles of the three corner reflecting plates overlapping at an intersection point, the vertex angles of the three corner reflecting plates being connected to the laser, and the round emitting hole being located at the intersection point.

Optionally, the on-board radar calibration device includes a bracket assembly, the laser-corner reflecting apparatus being mounted the bracket assembly, and the lase-corner reflecting apparatus may move relative to the bracket assembly, to adjust a height of the laser-corner reflecting apparatus.

Optionally, the bracket assembly includes a base, a vertical rod, and a sliding assembly;

the vertical rod being disposed vertically, one end thereof being fixed to the base;

the sliding assembly being movably mounted to the vertical rod and sliding along the vertical rod; and the laser-corner reflecting apparatus being mounted to the sliding assembly.

Optionally, the laser includes a laser body, the laser body including a fixed shaft and the round emitting hole, and the fixed shaft being perpendicular to the vertical rod; and an accommodating hole is disposed on the sliding assembly, and the fixed shaft is accommodated in the accommodating hole.

Optionally, the laser body includes a locating pin, the fixed shaft being parallel to the locating pin; and a locating hole is disposed on the sliding assembly, the locating pin being accommodated in the locating hole.

Optionally, the fixed shaft is cylindrical, one end thereof being fixedly connected to the laser body;

the locating pin is cylindrical, one end thereof being also fixedly connected to the laser body; and a central axis of the fixed shaft, a central axis of the locating pin, and a central axis of the round emitting hole are located in a same vertical plane.

Optionally, a switch, a charging interface, and a charging indicator are disposed on the laser body;

the switch being configured to turn on or turn off the laser body;

the charging interface being configured to connect a power source so as to charge the laser body; and the charging indicator being configured to indicate a charging state of the laser body.

Optionally, the sliding assembly includes a holder, the holder including a holder body, a clamping portion, a connecting rod, and a handle;

two clamping portions extend from the holder body, an accommodating hole is disposed between the two clamping portions, and there is a gap between the two clamping portions, the gap being in communication with the accommodating hole;

one end of the connecting rod penetrates through one of the clamping portions and is fixed to the another clamping portion, and the other end of the connecting rod is hinged on the handle; and a cam block and a rotation shaft are disposed on the handle, one end that is of the connecting rod and that is away from the clamping portion is connected to the rotation shaft, two cam blocks are sleeved on both ends of the rotation shaft, and the two cam blocks may rotate relative to the rotation shaft to press against the clamping portion, so that the two clamping portions clamp the two fixed shaft.

Optionally, the holder includes a compressing block, the compressing block being sleeved on the connecting rod, and the compressing block being located between the clamping portion and the cam block.

Optionally, the sliding assembly includes a clamping member, the clamping member being sleeved on the vertical rod and sliding along the vertical rod, and the clamping member clamping the vertical rod to fix the sliding assembly to a required position.

Optionally, a rack is further disposed on the vertical rod, the gear rack being disposed vertically;

the sliding assembly includes a self-locking member, the self-locking member including a fine adjustment knob and an adjusting gear;

the fine adjustment knob is movably mounted to the clamping member, and the fine adjustment knob may rotate relative to the clamping member; and the adjusting gear is sleeved on the fine adjustment knob, and the adjusting gear is meshed with the rack to fine adjust a height of the sliding assembly.

Optionally, the self-locking member includes a fixed rotation shaft, a pressing plate, and an elastic member;

both ends of the fixed rotation shaft being respectively fixedly mounted to the clamping member, and a central axis of the fixed rotation shaft being parallel to a rotation axis of the fine adjustment knob;

the pressing plate being sleeved on the fixed rotation shaft and the fine adjustment knob, the pressing plate rotating around the fixed rotation shaft to drive the fine adjustment knob to move relative to the clamping member, so that the gear is separated from the rack; and the elastic member being compressed between the pressing plate and the clamping member, to provide recovery elasticity for the pressing plate, so that the adjusting gear compresses the rack.

Optionally, the pressing plate includes a pressing plate body and a mounting ear;

two mounting ears extending from the pressing plate body, and the pressing plate body being sleeved on the fixed rotation shaft; and the two mounting ears being sleeved on the fine adjustment knob, and the adjusting gear being located between the two mounting ears.

Optionally, the clamping member includes a first clamping plate, a second clamping plate, and a locking knob;

the first clamping plate and the second clamping plate being respectively located at two opposite sides of the vertical rod and respectively abutting against the vertical rod; and one end of the locking knob penetrating through the first clamping plate, and the locking knob being engaged with the first clamping plate through threads, and when the locking knob is rotated, the locking knob penetrating through one end of the first clamping plate and abutting against the vertical rod, so that the clamping member is fixed to the vertical rod.

Optionally, the clamping member includes a friction pad and a pad screw;

the friction pad being disposed between the first clamping plate and the vertical rod for increasing friction between the first clamping plate and the vertical rod; and one end of the pad screw penetrating through the first clamping plate and abutting against the friction pad, and when the pad screw is rotated, a degree of contact between the friction pad and the vertical rod being adjusted, so as to adjust a magnitude of friction between the friction pad and the vertical rod.

Optionally, the base includes a base body, a horizontal adjustment member, and a gradienter;

one end of the vertical rod being fixedly mounted to the base body;

the horizontal adjustment member being mounted to the base body to adjust a horizontal angle of the base body; and the gradienter being mounted to the base body for detecting whether the base body is horizontally disposed.

Optionally, the base includes a supporting member, one end of the supporting member being fixedly mounted to a lower surface of the base body, and there being at least one supporting member, where one intersection point formed through intersection of one supporting member and the lower surface, and two intersection points formed respectively through intersection of the two horizontal adjustment members and the lower surface are respectively located at three vertexes of an isosceles triangle.

Optionally, there are three supporting members, the three supporting members being arranged orderly along a first straight line; and the two horizontal adjustment members are arranged orderly along a second straight line, and the first straight line is parallel to the second straight line.

Optionally, the horizontal adjustment member includes a handle and a screw portion;

the handle being fixedly mounted to one end of the screw portion, and the handle being located over the base body to facilitate rotation of the horizontal adjustment member; and the screw portion penetrating through the base body, the screw portion being engaged with the base body through threads, and the screw portion being vertically disposed.

Optionally, there are at least three horizontal adjustment members, where the three horizontal adjustment members respectively intersect the lower surface of the base body to form three intersection points, the three intersection points being respectively located at three vertexes of an isosceles triangle.

Optionally, the gradienter is mounted to an upper surface of the base body, and the gradienter includes a first horizontal bead and a second horizontal bead, the first horizontal bead being perpendicular to the second horizontal bead.

Optionally, a first calibration line, a second calibration line, and a third calibration line are disposed on the upper surface of the base body;

the first calibration line and the second calibration line being located on a same straight line; and the third calibration line being perpendicular to the first calibration line and the second calibration line, and a straight line on which the third calibration line is located passing through an intersection point of the vertical rod and the base body.

Optionally, a first calibration line and a third calibration line are disposed on an upper surface of the base body;

the third calibration line being perpendicular to the first calibration line, and a straight line on which the third calibration line is located passing through an intersection point of the vertical rod and the base body.

Optionally, the third calibration line is parallel to a central axis of the accommodating hole, and the third calibration line and the central axis of the accommodating hole are located in a same vertical plane.

Optionally, a height gauge is disposed for the vertical rod for measuring a moving distance or a height of the sliding assembly.

In comparison to the prior art, in the on-board radar calibration device of the embodiments of the present invention, the corner reflector may be aligned with the on-board radar using the laser, and then the on-board radar may be calibrated using the corner reflector, without the help of other calibration apparatuses, simplifying calibration operations of the on-board radar.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Figure 1:
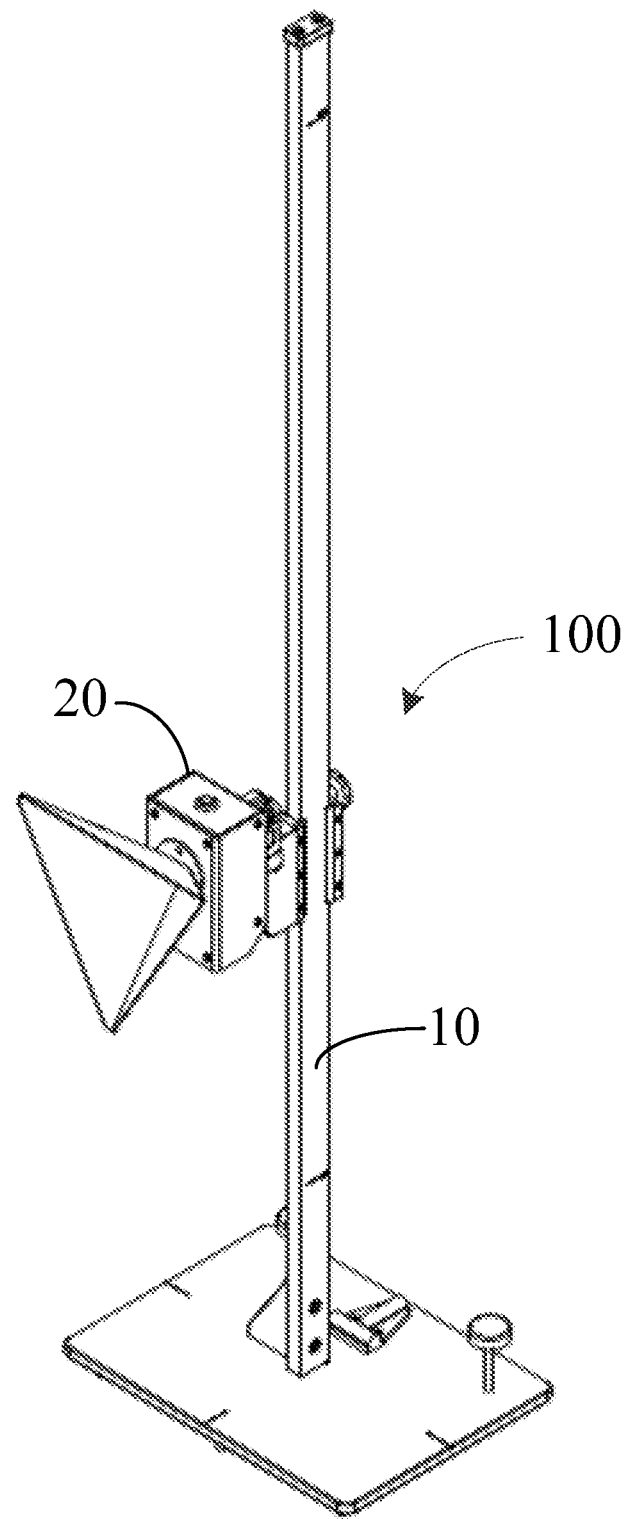
FIG. 1 is a three-dimensional diagram of an on-board radar calibration device according to an embodiment of the present invention.

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale. The terms "vertical", "horizontal", "left", "right", "inside", "outside", and similar expressions, as used in this specification, are for the purpose of description only.

Unless otherwise defined, all technical and scientific terms used herein have the same meaning as commonly understood by one of ordinary skill in the art to which the present invention belongs. The terms used in the specification of the present invention are merely used for describing specific embodiments, and are not intended to limit the present invention. As used herein, the term "and/or" includes any and all combinations of one or more related items listed.

In addition, the technical features provided in different embodiments of the present invention to be described below may be combined with each other as long as no conflict occurs.

Referring to FIG. 1, an on-board radar calibration device 100 according to an embodiment of the present invention includes a bracket assembly 10 and a laser-corner reflecting apparatus 20. The laser-corner reflecting apparatus 20 is mounted to the bracket assembly 10, and the laser-corner reflecting apparatus 20 may move relative to the bracket assembly 10 along a vertical direction, to adjust a height of the laser-corner reflecting apparatus 20.

Figure 2:
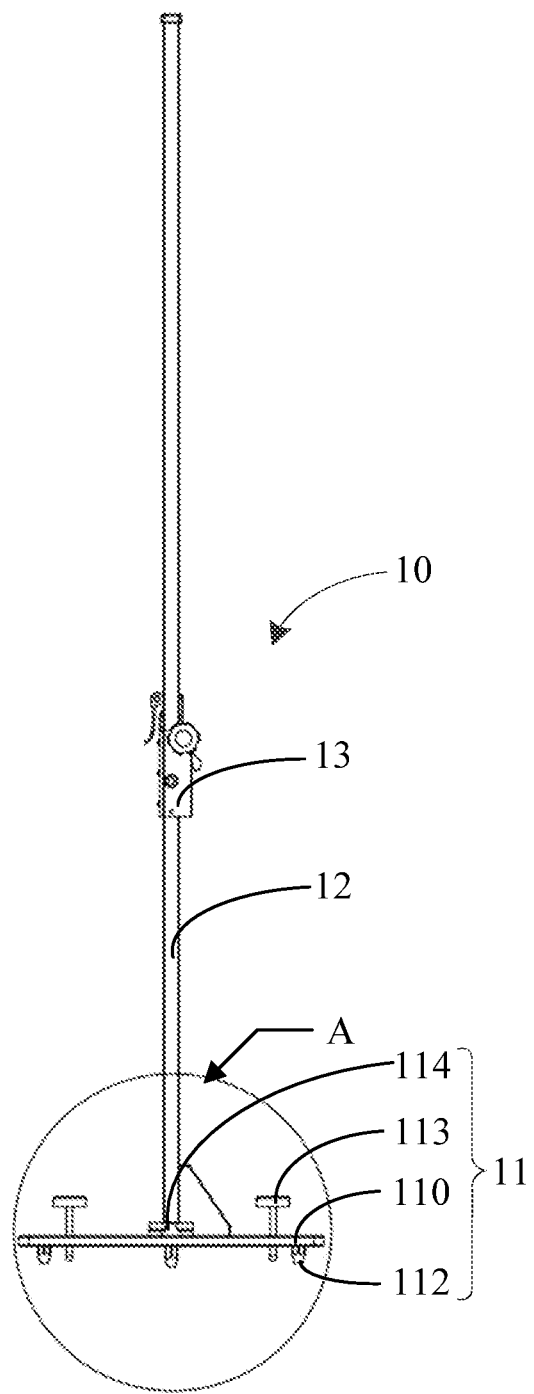
FIG. 2 is a three-dimensional diagram of a calibration device shown in FIG. 1 from another perspective.
Figure 3:
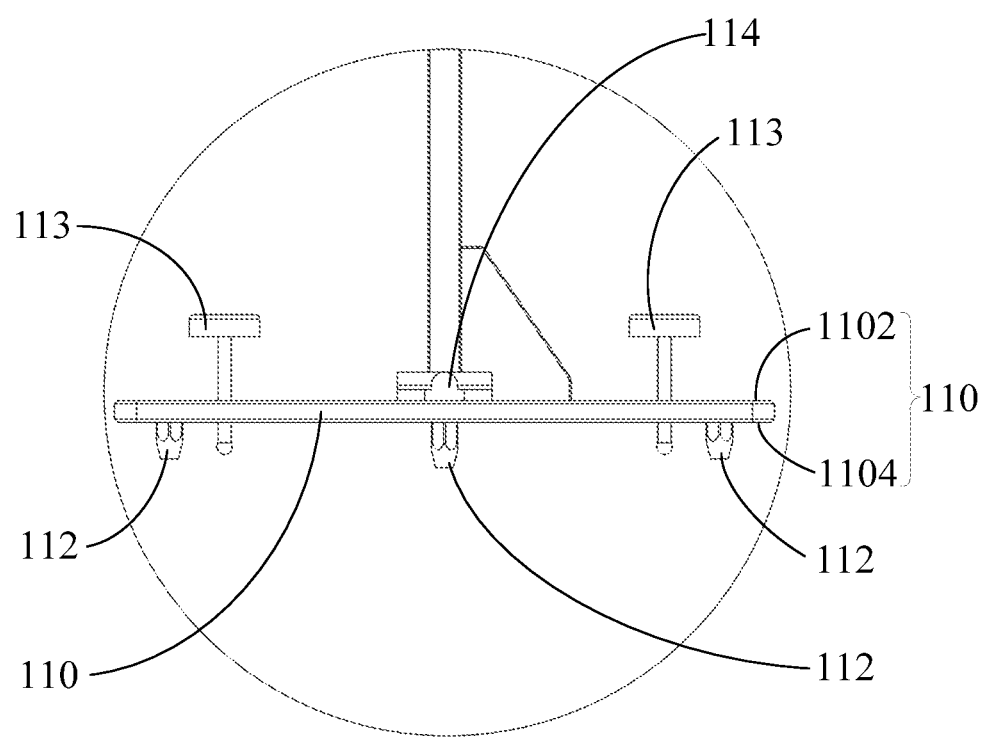
FIG. 3 is a partial enlarged diagram of a portion A in FIG. 2.

Referring to both FIG. 2 and FIG. 3, the bracket assembly 10 includes a base 11, a vertical rod 12, and a sliding assembly 13. The vertical rod 12 is vertically disposed, one end thereof being fixedly mounted to the base 11. The sliding assembly 13 is movably installed at the vertical rod 12, and the sliding assembly 13 may slide along the vertical rod 12.

The base 11 includes a base body 110, a supporting member 112, a horizontal adjustment member 113, and a gradienter 114.

The base body 110 is a rectangular plate and may be made of a metal material with a large mass, so that the bracket assembly 10 has a low center of gravity to stably support the laser-corner reflecting apparatus 20. The base body 110 includes an upper surface 1102 and a lower surface 1104.

Figure 4:
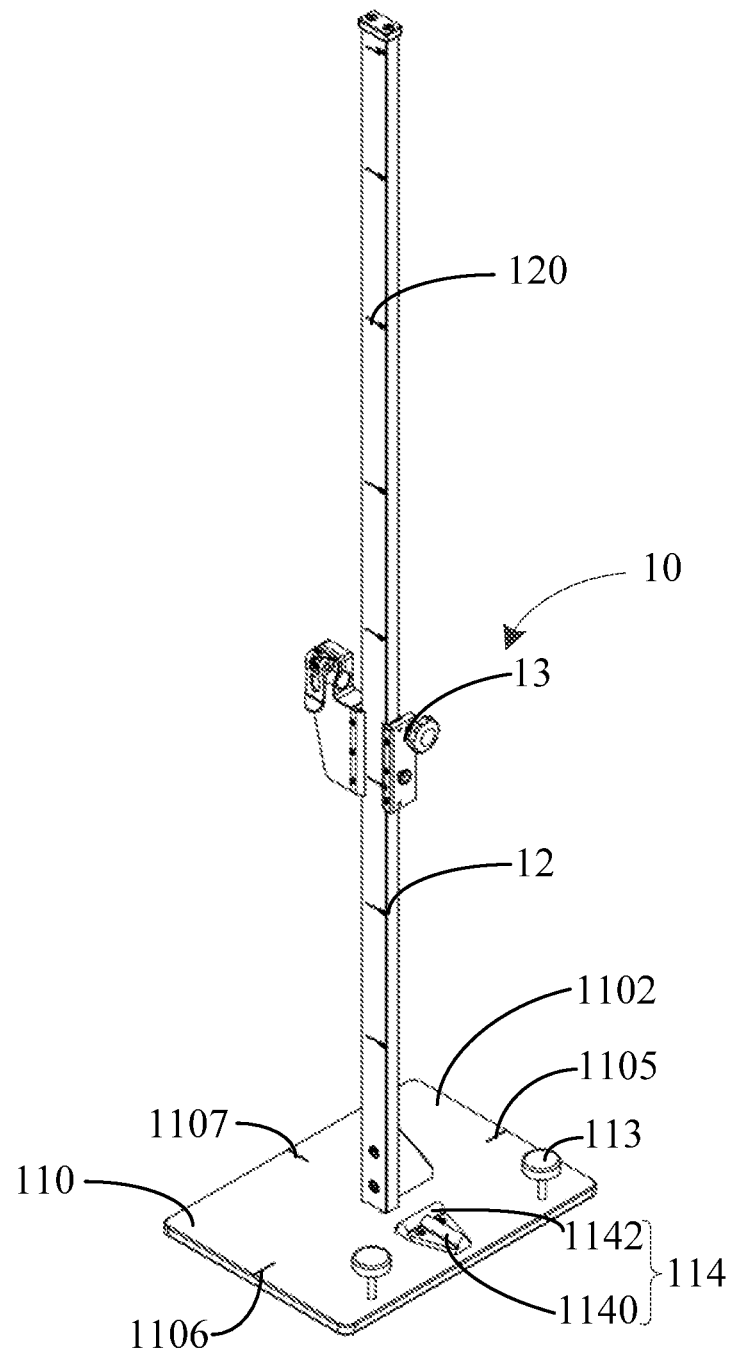
FIG. 4 is a three-dimensional diagram of a calibration device shown in FIG. 1 from still another perspective.
Figure 5:
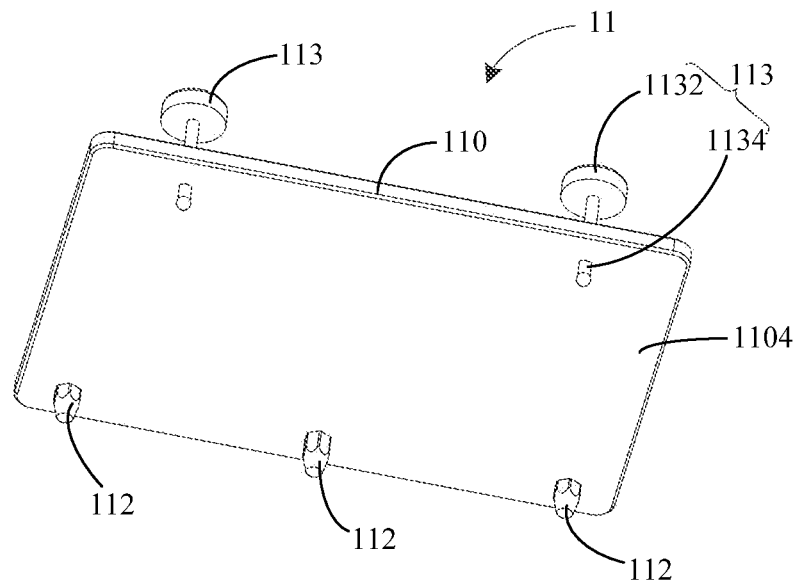
FIG. 5 is a three-dimensional diagram of a base of a calibration device shown in FIG. 1.

Referring to both FIG. 4 and FIG. 5, a first calibration line 1105, a second calibration line 1106, and a third calibration line 1107 are disposed on the upper surface 1102. The first calibration line 1105 and the second calibration line 1106 are located on a same straight line. The third calibration line 1107 is perpendicular to the first calibration line 1105 and the second calibration line 1106. It may be understood that, in some other embodiments, either or both of the first calibration line 1105 and the second calibration line 1106 may be omitted, that is, only either of the first calibration line 1105 or the second calibration line 1106 is disposed on the upper surface 1102, or neither of the first calibration line 1105 nor the second calibration line 1106 is disposed.

Definitely, a fourth calibration line (not shown in the figure) may further be disposed on the upper surface 1102, the fourth calibration line and the third calibration line 1107 being located on a same straight line, which is not limited thereto.

The supporting member 112 is disposed on the lower surface 1104, and the supporting member 112 is substantially columnar and disposed along a vertical direction. One end of the supporting member 112 is fixedly mounted to the lower surface 1104. Three supporting members 112 are arranged orderly along a first straight line. The first straight line is parallel to the first calibration line 1105 and the second calibration line 1106.

A horizontal adjustment member 113 includes a handle 1132 and a screw portion 1134. The handle 1132 is fixedly mounted to one end of the screw portion 1134. The screw portion 1134 penetrates through the upper surface 1102 and the lower surface 1104. The screw portion 1134 is engaged with the base body 110 through threads, and the screw portion 1134 is vertically disposed. The handle 1132 is located over the upper surface 1102 to facilitate rotation of the horizontal adjustment member 113, so that the horizontal adjustment member 113 moves relative to the base body 110 along a vertical direction, so as to adjust depression and elevation angles of the base body 110. Two horizontal adjustment members 113 are arranged orderly along a second straight line. The first straight line is parallel to the second straight line. One intersection point formed through intersection of one of the supporting members 112 and the lower surface 1104, and two intersection points formed respectively through intersection of the two horizontal adjustment members 113 and the lower surface 1104 are respectively located at three vertexes of an isosceles triangle.

It may be understood that, in some other embodiments, a quantity of the supporting members 112 may be increased or decreased according to actual requirements, but there must be at least one supporting member. In addition, one intersection point formed through intersection of one of the supporting members 112 and the lower surface 1104, and two intersection points formed respectively through intersection of the two horizontal adjustment members 113 and the lower surface 1104 are respectively located at the three vertexes of the isosceles triangle.

It may be understood that, in some other embodiments, the horizontal adjustment member 113 may be other structures as long as the structures can adjust depression and elevation angles of the base body 110. There may also be at least three horizontal adjustment members 113, but the supporting member 112 is omitted, and the three horizontal adjustment members 113 respectively intersect the lower surface 1104 of the base body 110 to form three intersection points, the three intersection points being respectively located at the three vertexes of the isosceles triangle.

A gradienter 114 is mounted to the upper surface 1102 for detecting whether the base body 110 is horizontally disposed. The gradienter 114 includes a first horizontal bead 1140 and a second horizontal bead 1142, the first horizontal bead 1140 being perpendicular to the second horizontal bead 1142. It may be understood that, in some other embodiments, the gradienter 114 may also be other structures as long as the structures can be used to detect whether the base body 110 is horizontally disposed.

One end of the vertical rod 12 is fixedly mounted to the upper surface 1102, and the vertical rod 12 is perpendicular to the base body 110. A straight line on which the third calibration line 1107 is located passes through an intersection point of the vertical rod 12 and the base body 110. A height gauge 120 is disposed for the vertical rod 12 for measuring a moving distance or a height of the sliding assembly 13. A rack 122 is further disposed on the vertical rod 12, the rack 122 being disposed along a vertical direction (see FIG. 9).

Figure 6:
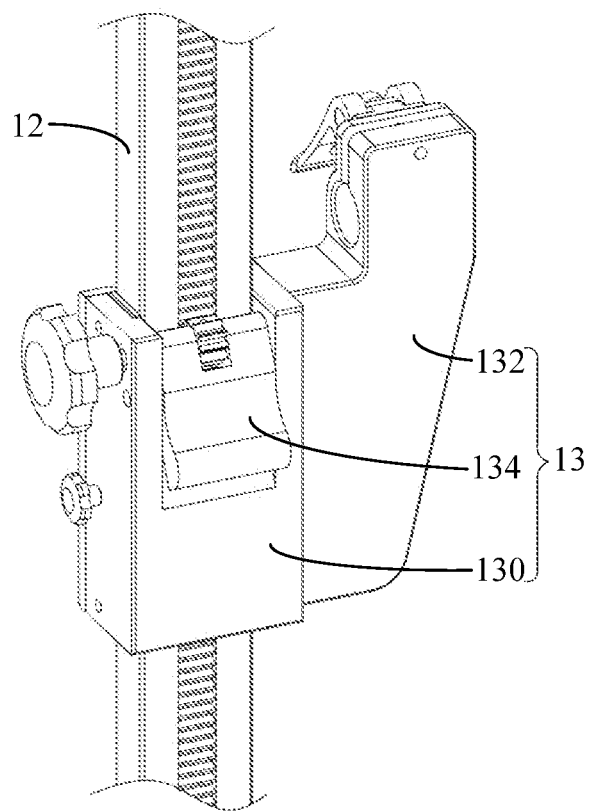
FIG. 6 is a schematic assembly diagram of a sliding assembly and a vertical rod of a calibration device shown in FIG. 1.

Referring to FIG. 6, the sliding assembly 13 is made of an elastic material, for example, a metal material or a plastic material, etc. The sliding assembly 13 includes a clamping member 130, a holder 132, and a self-locking member 134. The clamping member 130 is sleeved on the vertical rod 12, may slide along the vertical rod 12, and may clamp the vertical rod 12 to fix the sliding assembly 13 to a required position. The holder 132 is fixedly mounted to the clamping member 130 for supporting the laser-corner reflecting apparatus 20. The self-locking member 134 is mounted to the clamping member 130 for switching between large-stroke adjustment of a height of the sliding assembly 13 and fine adjustment of the height of the sliding assembly 13.

Figure 7:
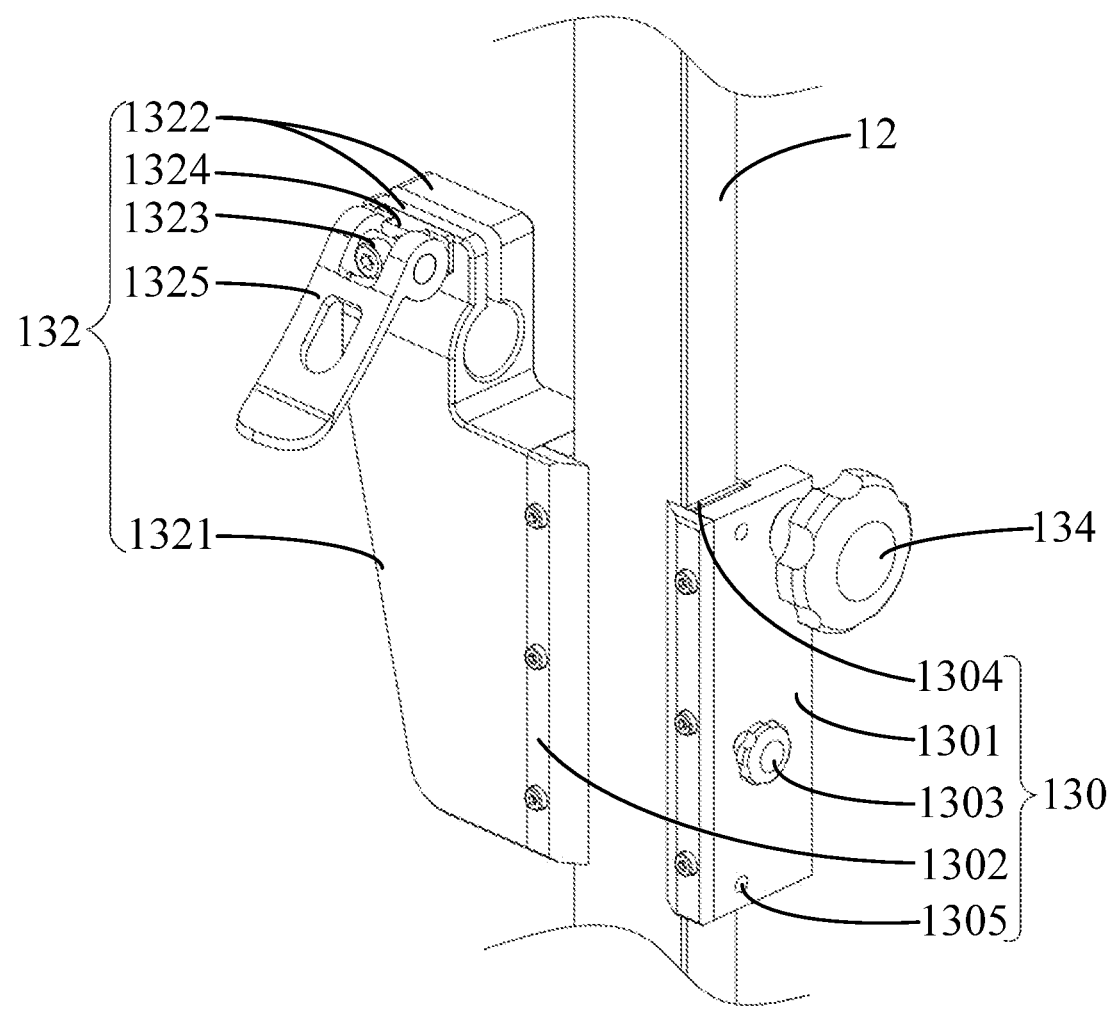
FIG. 7 is a schematic assembly diagram of a sliding assembly and a vertical rod of a calibration device shown in FIG. 1 from another perspective, a handle of the sliding assembly being cocked.

Referring to FIG. 7, the clamping member 130 includes a first clamping plate 1301, a second clamping plate 1302, a locking knob 1303, a friction pad 1304, and a pad screw 1305.

The first clamping plate 1301 is connected to the second clamping plate 1302, and the first clamping plate 1301 and the second clamping plate 1302 are respectively located at two opposite sides of the vertical rod 12 and respectively abut against the vertical rod 12.

One end of the locking knob 1303 penetrates through the first clamping plate 1301, and the locking knob 1303 is engaged with the first clamping plate 1301 through threads. The locking knob 1303 is rotated to enable the locking knob 1303 to penetrate through one end of the first clamping plate 1301 and abut against the vertical rod 12, so that the clamping member 130 is fixed to the vertical rod 12.

The friction pad 1304 is disposed between the first clamping plate 1301 and the vertical rod 12 for increasing friction between the first clamping plate 1301 and the vertical rod 12.

There are two pad screws 1305, and one end of each of the pad screws 1305 penetrates through the first clamping plate 1301 and abuts against the friction pad 1304. The pad screw 1305 is rotated to adjust a degree of contact between the friction pad 1304 and the vertical rod 12, so as to adjust a magnitude of friction between the friction pad 1304 and the vertical rod 12. In this embodiment, a magnitude of the friction between the friction pad 1304 and the vertical rod 12 may be adjusted as required, so that the sliding assembly 13 may smoothly slide relative to the vertical rod 12. It may be understood that, in some other embodiments, the friction pad 1304 and the pad screw 1305 may be omitted.

Figure 8:
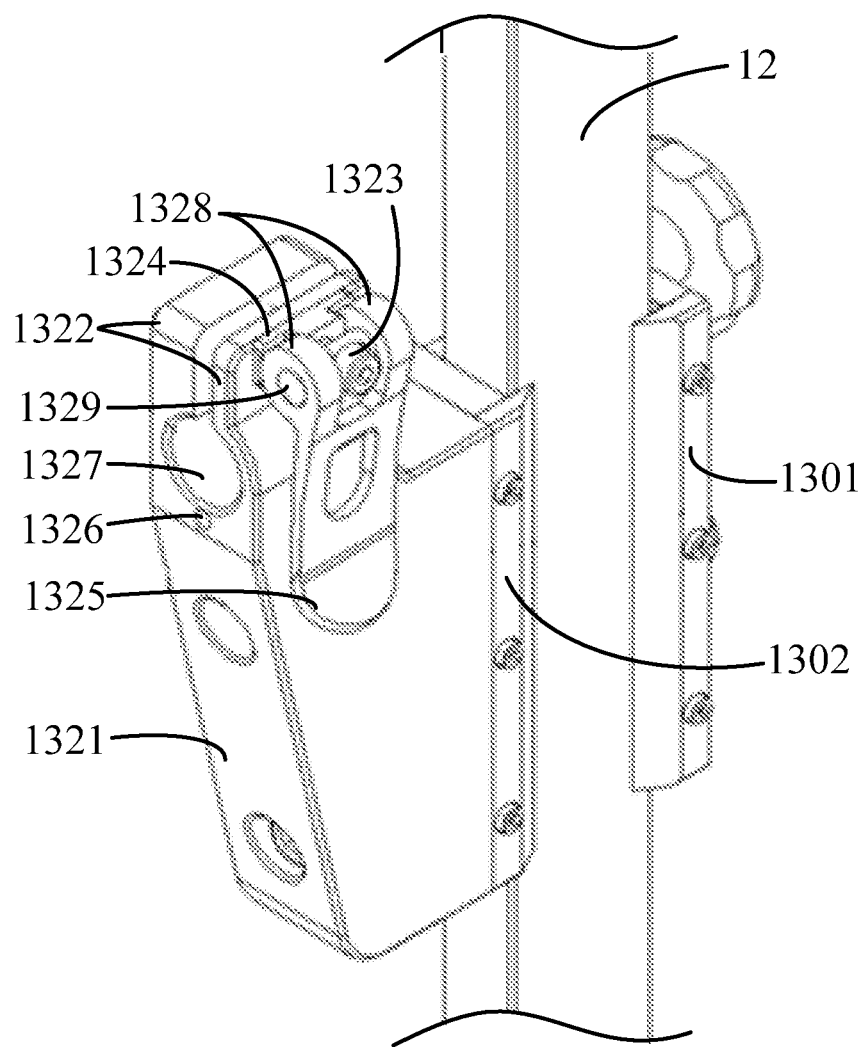
FIG. 8 is a three-dimensional assembly diagram of a sliding assembly and a vertical rod of a calibration device shown in FIG. 1 from still another perspective, the handle being pressed down.
Figure 9:
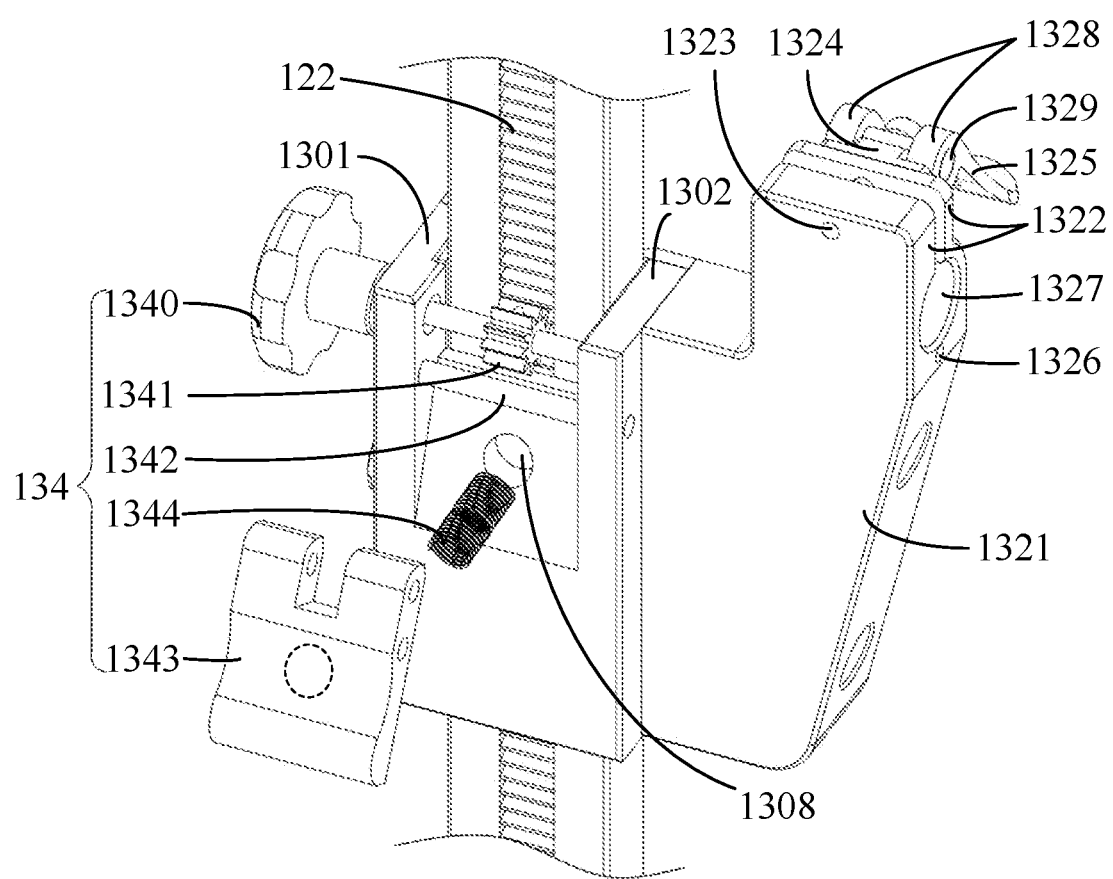
FIG. 9 is a partial exploded diagram of a sliding assembly of a calibration device shown in FIG. 1.

With reference to FIG. 7 and referring to both FIG. 8 and FIG. 9, the holder 132 includes a holder body 1321, a clamping portion 1322, a connecting rod 1323, a compressing block 1324, and a handle 1325.

The holder body 1321 is fixedly connected to the second clamping plate 1302, and a locating hole 1326 is disposed on the holder body 1321.

Two clamping portions 1322 extend from the holder body 1321, an accommodating hole 1327 is disposed between the two clamping portions 1322, and there is a gap between the two clamping portions 1322, the gap being in communication with the accommodating hole 1327. The locating hole 1326 and the accommodating hole 1327 are both cylindric and horizontally disposed. A central axis of the locating hole 1326 and a central axis of the accommodating hole 1327 are both parallel to the third calibration line 1107, and the central axis of the locating hole 1326, the central axis of the accommodating hole 1327, and the third calibration line 1107 are located in a same vertical plane.

One end of the connecting rod 1323 penetrates through one of the clamping portions 1322 and is fixed to the other clamping portion 1322, and the other end of the connecting rod 1323 is hinged on the handle 1325. The compressing block 1324 is sleeved on the connecting rod 1323, and the compressing block 1324 is located between the clamping portion 1322 and the handle 1325. The compressing block 1324 may be made of a metal material, for example, copper.

A cam block 1328 and a rotation shaft 1329 are disposed for the handle 1325. One end that is of the connecting rod 1323 and that is away from the clamping portion 1322 is connected to a central portion of the rotation shaft 1329. Two cam blocks 1328 are sleeved on both ends of the rotation shaft 1329, the two cam blocks 1328 may rotate relative to the rotation shaft 1329, and the two cam blocks 1328 are parallel to each other and are spaced apart by a preset distance.

The handle 1325 is pressed to enable the two cam blocks 1328 to rotate around the rotation shaft 1329. During rotation of the cam blocks 1328, the cam blocks 1328 compress the compressing block 1324 to enable the two clamping portions 1322 to move toward each other, and the accommodating hole 1327 is narrowed to clamp the laser-corner reflecting apparatus 20 (see FIG. 8). The handle 1325 is cocked to enable the two cam blocks 1328 to rotate oppositely around the rotation shaft 1329, the cam blocks 1328 release squeezing of the compressing block 1324, the two clamping portions 1322 move oppositely, and the accommodating hole 1327 is enlarged to take the laser-corner reflecting apparatus 20 down from the holder 132 (see FIG. 7). With the holder 132 of this embodiment, the laser-corner reflecting apparatus 20 may be conveniently and rapidly installed or dismantled. In addition, the compressing block 1324 is disposed between the clamping portion 1322 and the handle 1325 for increasing a degree of compressing the clamping portion 1322 by the two cam blocks 1328, so that the two clamping portions 1322 may more firmly clamp the laser-corner reflecting apparatus 20.

It may be understood that, in some other embodiments, the compressing block 1324 may be omitted, and the two cam blocks 1328 may directly compress the clamping portion 1322.

Figure 10:
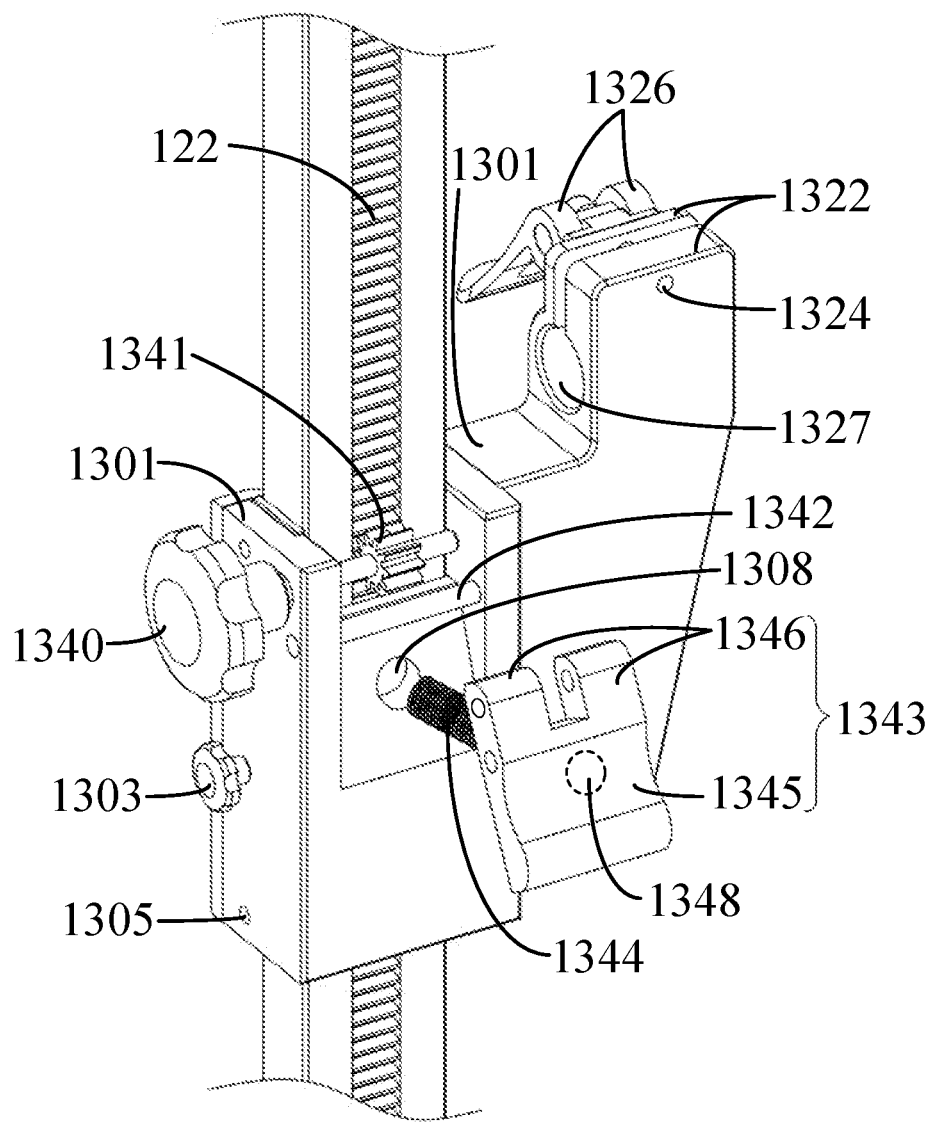
FIG. 10 is a partial exploded diagram of a sliding assembly of a calibration device shown in FIG. 1 from another perspective.

Referring to both FIG. 9 and FIG. 10, the self-locking member 134 includes a fine adjustment knob 1340, an adjusting gear 1341, a fixed rotation shaft 1342, a pressing plate 1343, and an elastic member 1344.

One end of the fine adjustment knob 1340 is movably mounted to the second clamping plate 1302 after penetrating through the first clamping plate 1301. The fine adjustment knob 1340 may rotate relative to the first clamping plate 1301 and the second clamping plate 1302, and may move in parallel relative to the first clamping plate 1301 and the second clamping plate 1302.

The adjusting gear 1341 is sleeved on the fine adjustment knob 1340 and located between the first clamping plate 1301 and the second clamping plate 1302, and the adjusting gear 1341 is meshed with the rack 122.

Both ends of the fixed rotation shaft 1342 are respectively fixedly mounted to the first clamping plate 1301 and the second clamping plate 1302, and a central axis of the fixed rotation shaft 1342 is parallel to a rotation axis of the fine adjustment knob 1340.

The pressing plate 1343 includes a pressing plate body 1345 and a mounting ear 1346. A first mounting hole 1348 is disposed for the pressing plate body 1345. Two mounting ears 1346 extend from the pressing plate body 1345, and the two mounting ears 1346 are spaced apart by a preset distance and disposed in parallel. The pressing plate body 1345 is sleeved on the fixed rotation shaft 1342, the two mounting ears 1346 are sleeved on the fine adjustment knob 1340, and the adjusting gear 1341 is located between the two mounting ears 1346.

The elastic member 1344 is compressed between the pressing plate 1343 and the clamping member 130. Both ends of the elastic member 1344 are respectively accommodated in a first mounting hole 1348 of the pressing plate 1343 and a second mounting hole 1308 of the clamping member 130. In this embodiment, the elastic member 1344 is a compression spring for providing recovery elasticity. It may be understood that, in some other embodiments, the elastic member 1344 may be a spring piece or other elastic members that can provide the recovery elasticity.

The pressing plate 1343 is pressed, so that the pressing plate 1343 rotates around the fixed rotation shaft 1342, the elastic member 1344 is further compressed, and the mounting ear 1346 drives the fine adjustment knob 1340 to move relative to the first clamping plate 1301 and the second clamping plate 1302, so that the gear 1341 is separated from the rack 122. In this case, the locking knob 1303 is rotated to enable the locking knob 1303 to be not in contact with the vertical rod 12, and the sliding assembly 13 may move relative to the vertical rod 12 by a large stroke. The pressing plate 1343 is loosened, and the elastic member 1344 generates the recovery elasticity to push the pressing plate 1343 to rotate reversely around the fixed rotation shaft 1342, so that the adjusting gear 1341 is meshed with the rack 122. In this case, the elastic member 1344 provides elasticity to enable the adjusting gear 1341 to press against the rack 122. The fine adjustment knob 1340 is rotated, and the adjusting gear 1341 rotates and drives the rack 122 to move, so that a position of the sliding assembly 13 relative to the vertical rod 12 may be fine adjusted.

With the self-locking member 134, a height of the sliding assembly 13 may be adjusted by a large stroke, or a height of the sliding assembly 13 may be fine adjusted. It may be understood that, in some other embodiments, the fixed rotation shaft 1342, the pressing plate 1343, and the elastic member 1344 may be omitted, the adjusting gear 1341 is meshed with the rack 122, and the self-locking member 134 may only fine adjust the height of the sliding assembly 13. Alternatively, the self-locking member 134 and the rack 122 may be omitted, and the height of the sliding assembly 13 may be adjusted only by a large stroke.

Figure 11:
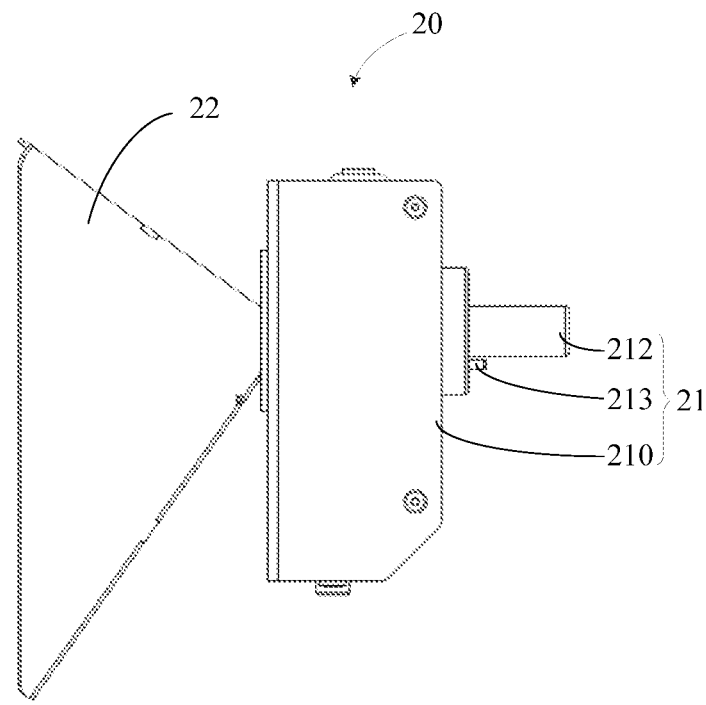
FIG. 11 to FIG. 14 are respective three-dimensional diagrams of a laser-corner reflecting apparatus of a calibration device shown in FIG. 1 from different angles.

Referring to FIG. 11, the laser-corner reflecting apparatus 20 includes a laser 21 and a corner reflector 22. The laser 21 is configured to emit a laser, so as to align a position of the corner reflector 22 with that of an on-board radar. The corner reflector 22 is mounted to the laser 21 for reflecting a radar wave emitted from any direction, so that the radar wave returns along an original path, to calibrate an installation position and an installation angle of the on-board radar.

The laser 21 includes a laser body 210, a fixed shaft 212, and a locating pin 213. The laser body 210 is configured to emit a laser. One end of the fixed shaft 212 is fixedly connected to the laser body 210, and one end of the locating pin 213 is also fixedly connected to the laser body 210. Both the fixed shaft 212 and the locating pin 213 are cylindric, and the fixed shaft 212 and the locating pin 213 are parallel to each other and perpendicular to the vertical rod 12. Both the fixed shaft 212 and the locating pin 213 are parallel to an emitting direction of the laser.

Figure 12:
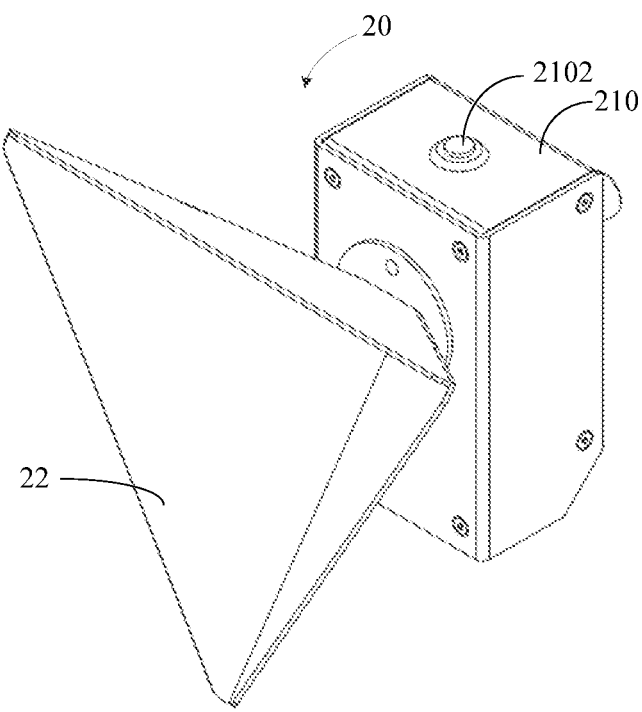
Figure 13:
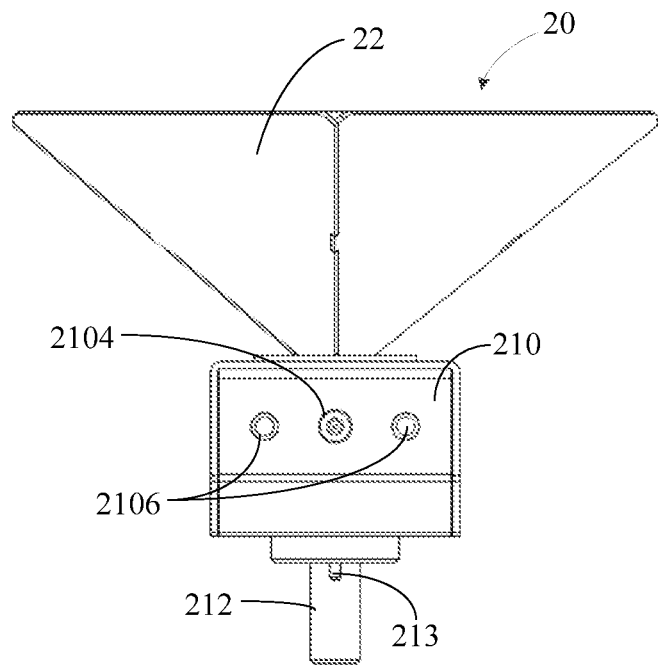
Figure 14:
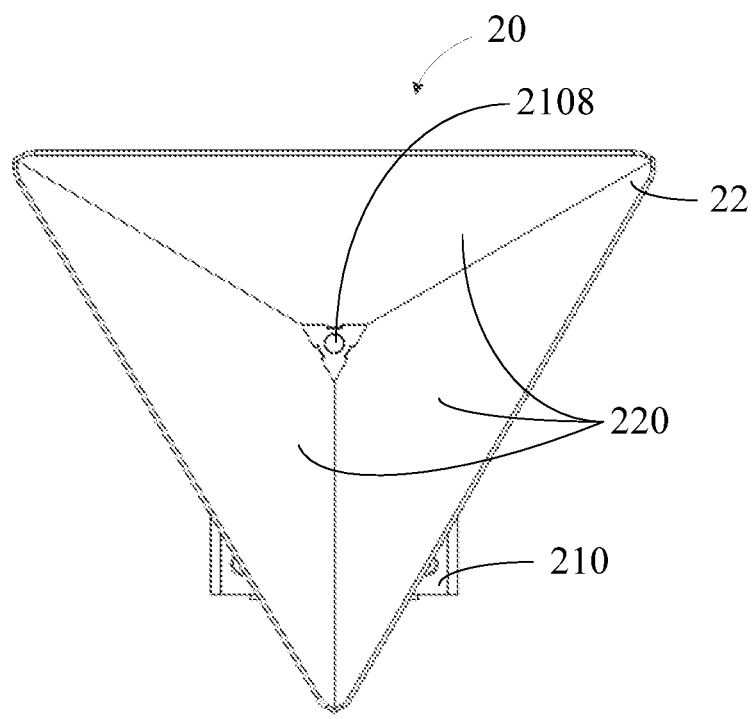

Still referring to FIG. 12 and FIG. 14, a switch 2102, a charging interface 2104, and a charging indicator 2106 are disposed on the laser body 210. The switch 2102 is configured to turn on or turn off the laser body 210, the charging interface 2104 is configured to connect a power source to charge the laser body 210, and the charging indicator 2106 is configured to indicate a charging state of the laser body 210, for example, red light indicates charging, and green light indicates charging completed. A round emitting hole 2108 is further disposed on the laser body 210 to emit a laser. A central axis of the fixed shaft 212, a central axis of the locating pin 213, and a central axis of the round emitting hole 2108 are located in a same vertical plane.

The corner reflector 22 includes a corner reflecting plate 220, there are three corner reflecting plates 220, and each of the corner reflecting plates 220 is an isosceles triangle plate. Angle sides of the three corner reflecting plates 220 are connected to each other, vertexes of vertex angles of the three corner reflecting plates 220 overlap at an intersection point, and the vertex angles of the three corner reflecting plates 220 are connected to the laser body 210, the round emitting hole 2108 being located at the intersection point. Each of the corner reflecting plates 220 may be made of a metal material to reflect a radar wave. Alternatively, each of the corner reflecting plate 220 has a radar wave reflection layer, the radar wave reflection layer being made of a radar wave reflective material to reflect the radar wave.

Referring to both FIG. 8 and FIG. 11, when the laser-corner reflecting apparatus 20 is mounted to the holder 132, the fixed shaft 212 is inserted into the accommodating hole 1327, and the locating pin 213 is inserted into the locating hole 1326. The handle 1325 is pressed to enable the two cam blocks 1328 to press against the compressing block 1324, so that the two clamping portions 1322 move toward each other, and the accommodating hole 1327 is narrowed to clamp the fixed shaft 212, so that the laser-corner reflecting apparatus 20 may be conveniently fixed to the holder 132.

When the laser-corner reflecting apparatus 20 is detached from the holder 132, the handle 1325 is cocked, the two cam blocks 1328 release squeezing of the compressing block 1324, and the two clamping portions 1322 move oppositely. The fixed shaft 212 is loosened to take the laser-corner reflecting apparatus 20 down from the holder 132.

When the laser-corner reflecting apparatus 20 is mounted to the holder 132 with cooperation of the locating pin 213 and the locating hole 1326, it is ensured that an emitting direction of laser emitted by the laser-corner reflecting apparatus 20 is perpendicular to the vertical rod 12, so as to ensure the laser emitted by the laser-corner reflecting apparatus 20 is horizontally emitted after the base body 110 is horizontally adjusted, to ensure that the on-board radar is accurately calibrated.

Figure 15:
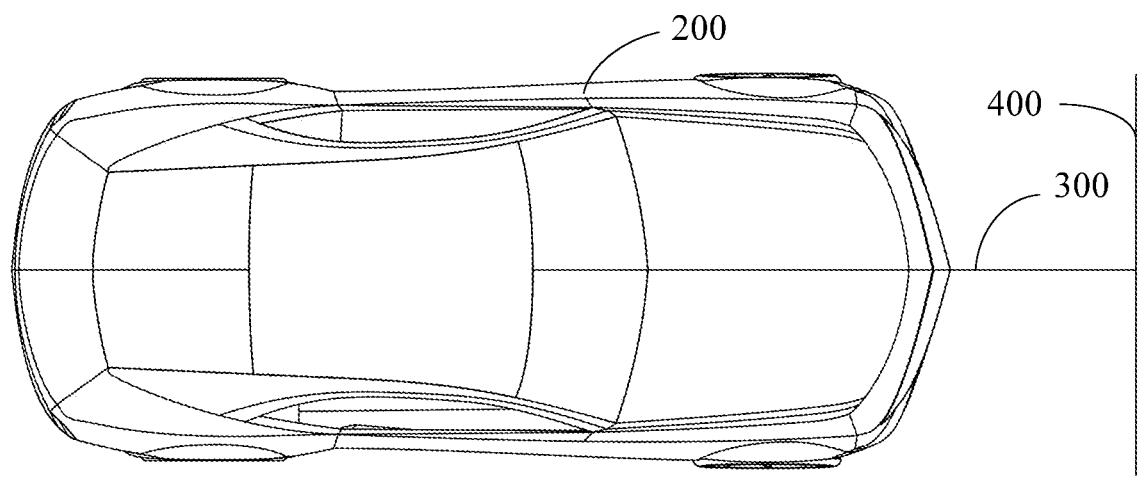
FIG. 15 to FIG. 17 are respective schematic diagrams of different steps in which an on-board radar is calibrated using a calibration device according to an embodiment of the present invention.

Referring to FIG. 15, in a first step of calibrating the on-board radar, a center line of a body of a to-be-calibrated automobile 200 is calibrated, and a projected center line 300 thereof is marked on the ground. According to a vehicle calibration requirement, an equidistant line 400 of a calibration distance that is perpendicular to the central projection line 300 is drawn.

Figure 16:
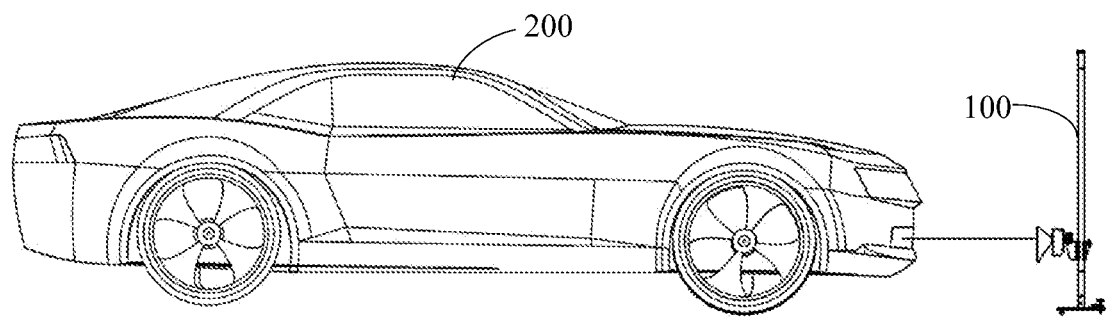
Figure 17:
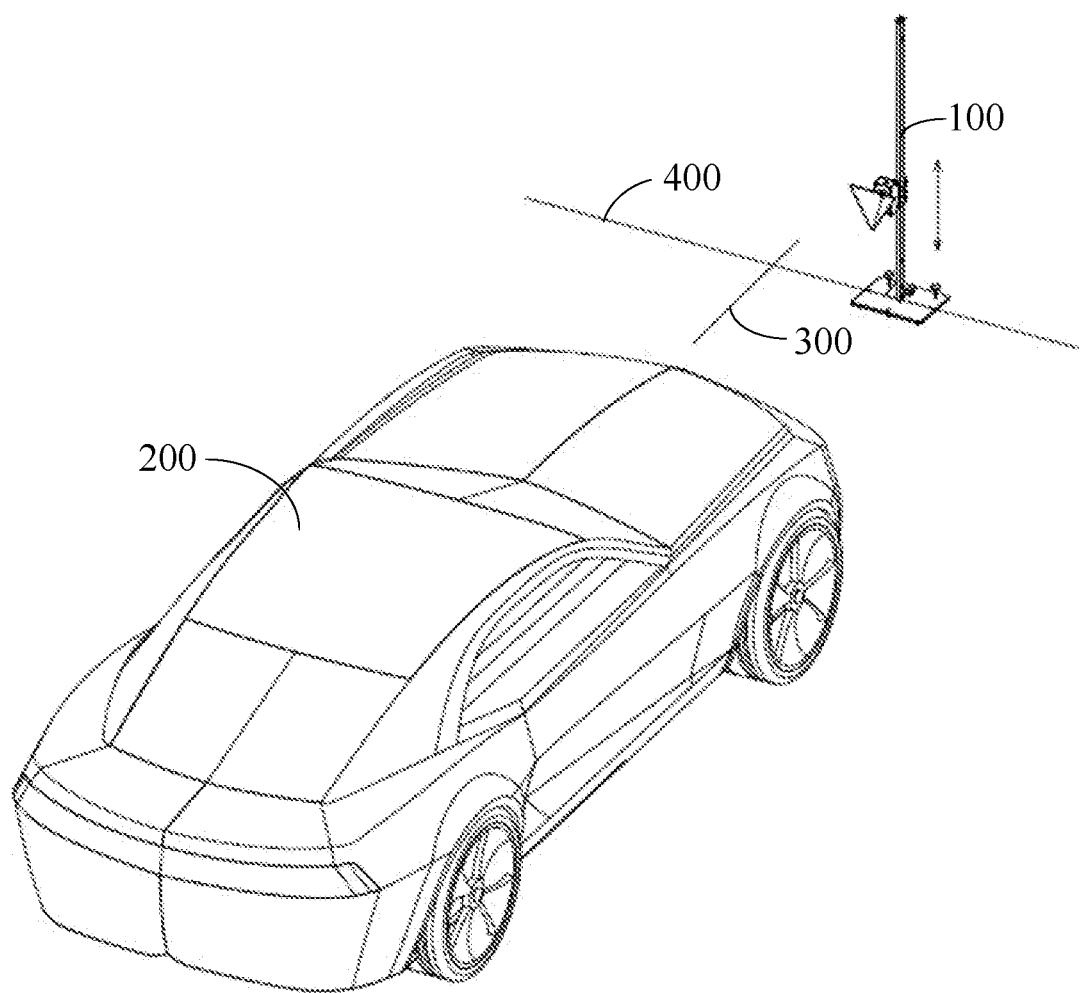

Referring to FIG. 4, FIG. 16, and FIG. 17 together, in a second step of calibrating the on-board radar, the round emitting hole 2108 of the laser-corner reflecting apparatus 20 is enabled to directly face a head of the to-be-calibrated automobile 200, and a first calibration line 1105 and a second calibration line 1106 of the base body 110 and the equidistant line 400 overlap. Left and right positions of the base body 110 are adjusted, so that the third calibration line 1107 and the projected center line 300 overlap, and a height of the laser-corner reflecting apparatus 20 is adjusted until a laser point can approximately irradiate a center of the on-board radar, that is, initial alignment of the laser-corner reflecting apparatus and the on-board radar is completed.

In a third step of calibrating the on-board radar, the first calibration line 1105 and the second calibration line 1106 are kept to coincide with the equidistant line 400, and the third calibration line 1107 is kept to coincide with the projected center line 300. A horizontal adjustment member 113 of the base body 110 is adjusted to enable bubbles of the first horizontal bead 1140 and the second horizontal bead 1142 to be at central positions. In addition, a position of the laser point on the on-board radar is noticed, and the height and a horizontal position of the laser-corner reflecting apparatus 20 are adjusted through cooperation, until the laser point is also illuminated at a center of the on-board radar when the bubbles of the first horizontal bead 1140 and the second horizontal bead 1142 are located at the center of the horizontal bead. Therefore, accurate alignment of the laser-corner reflecting apparatus 20 and the on-board radar is completed.

In a fourth step of calibrating the on-board radar, according to an actual calibration requirement, when the bracket assembly 10 is kept motionless, the height of the laser-corner reflecting apparatus 20 on the bracket assembly 10 may be adjusted, thereby reflecting the radar wave emitted by the on-board radar in different heights, to calibrate an installation position and an installation angle of the on-board radar.

In the embodiment of the present invention, the laser-corner reflecting apparatus 20 includes a laser 21 and a corner reflector 22. The corner reflector 22 is mounted to the laser 21, and the laser 21 emits a laser to align a position of the corner reflector 22 with that of the on-board radar. After the position of the corner reflector 22 is aligned with that of the on-board radar, the corner reflector 22 reflects the radar wave emitted by the on-board radar, so that the radar wave returns along an original path to calibrate the installation position and the installation angle of the on-board radar. The corner reflector 22 may be aligned with the on-board radar using the laser 21, and then the on-board radar is calibrated using the corner reflector 22, without the help of other calibration apparatuses, simplifying calibration operations of the on-board radar.

In addition, the laser-corner reflecting apparatus 20 is mounted to the bracket assembly 10, and the laser-corner reflecting apparatus 20 may move relative to the bracket assembly 10 to adjust the height of the laser-corner reflecting apparatus 20, so that the on-board radar calibration device 100 may be adapted to heights of different vehicle types to calibrate on-board radars of different vehicle types.

In addition, the fixed shaft 212 is inserted into the accommodating hole 1327, and the clamping portion 1322 clamps a structure of the fixed shaft 212, so that the laser-corner reflecting apparatus 20 may be conveniently and rapidly mounted to the holder 132 or detached from the holder 132. What's more, when the locating pin 213 is inserted into the locating hole 1326, it can be ensured that a laser emitted from the round emitting hole 2108 is perpendicular to the vertical rod 12, so that the laser emitted from the round emitting hole 2108 is horizontally emitted after the base body 110 is horizontally adjusted, to align a position of the corner reflector 22 with that of the on-board radar.

Furthermore, with the self-locking member 134, the height of the sliding assembly 13 may be adjusted by a large stroke, or the height of the sliding assembly 13 may be fine adjusted, so as to flexibly meet different use requirements.

Finally, the third calibration line 1107 is disposed on the base body 110 to facilitate calibration of the bracket assembly 10 with a center line of the automobile body on a projected center line 300 on the ground. At least one of the first calibration line 1105 and the second calibration line 1106 is disposed on the base body 110 to facilitate calibration of the bracket assembly 10 with the equidistant line 400, to make preparation for accurate calibration on the laser-corner reflecting apparatus 20 carried by the bracket assembly 10. In addition, the central axis of the locating hole 1326 and the central axis of the accommodating hole 1327 are both parallel to the third calibration line 1107, and the central axis of the locating hole 1326, the central axis of the accommodating hole 1327, and the third calibration line 1107 are located in a same vertical plane. When the third calibration line 1107 is aligned with the projected center line 300, the laser-corner reflecting apparatus 20 may be easily aligned with the center line of the to-be-calibrated automobile 200.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. An on-board radar calibration device, comprising:
   a bracket assembly comprising:
   a base;
   a vertical rod disposed vertically, one end of the vertical rod being mounted to the base, wherein the vertical rod is provided with a rack, the rack being disposed vertically on the vertical rod;
   a sliding assembly movably mounted to the vertical rod and movable along the vertical rod, an accommodating hole being disposed on the sliding assembly;
   wherein the sliding assembly comprises a clamping member and a self-locking member, the self-locking member comprising a fine adjustment knob and an adjusting gear;
   wherein the fine adjustment knob is movably mounted to the clamping member, and the fine adjustment knob is rotatable relative to the clamping member;
   wherein the adjusting gear is sleeved on the fine adjustment knob, and the adjusting gear is meshed with the rack to fine adjust a height of the sliding assembly;
   a laser-corner reflecting apparatus mounted to the sliding assembly, the laser-corner reflecting apparatus being movable relative to the bracket assembly to adjust a height of the laser-corner reflecting apparatus;
   wherein the laser-corner reflecting apparatus comprises:
   a laser comprising a laser body, the laser body comprising a fixed shaft and a round emitting hole, the fixed shaft being perpendicular to the vertical rod, the fixed shaft being accommodated in the accommodating hole; and
   a corner reflector mounted to the laser;
   wherein the laser is configured to emit a laser to align a position of the corner reflector with that of an on-board radar, the corner reflector being configured to reflect a radar wave emitted by the on-board radar, so that the radar wave returns along an original path to calibrate an installation angle of the on-board radar.

2. The calibration device according to claim 1, wherein the laser body comprises a locating pin, the fixed shaft being parallel to the locating pin; and
   wherein a locating hole is disposed on the sliding assembly, and the locating pin is accommodated in the locating hole.

3. The calibration device according to claim 2, wherein the fixed shaft is cylindrical, one end thereof being fixedly connected to the laser body;
   wherein the locating pin is cylindrical, one end thereof being also fixedly connected to the laser body; and
   wherein a central axis of the fixed shaft, a central axis of the locating pin, and a central axis of the round emitting hole are located in a same vertical plane.

4. The calibration device according to claim 1, wherein a switch, a charging interface, and a charging indicator are disposed on the laser body;
   the switch being configured to turn on or turn off the laser body;
   the charging interface being configured to connect a power supply to charge the laser body; and
   the charging indicator being configured to indicate a charging state of the laser body.

5. The calibration device according to claim 1, wherein the sliding assembly comprises a holder, the holder comprising a holder body, a clamping portion, a connecting rod, and a handle;
   wherein two clamping portions extend from the holder body, an accommodating hole is disposed between the two clamping portions, and there is a gap between the two clamping portions, the gap being in communication with the accommodating hole;
   wherein one end of the connecting rod penetrates through one of the clamping portions and is fixed to the other clamping portion, and the other end of the connecting rod is hinged on the handle; and
   wherein a cam block and a rotation shaft are disposed on the handle, one end that is of the connecting rod and that is away from the clamping portion is connected to the rotation shaft, two cam blocks are sleeved on both ends of the rotation shaft, and the two cam blocks are rotatable relative to the rotation shaft, to press against the clamping portion, so that the two clamping portions clamp the fixed shaft.

6. The calibration device according to claim 5, wherein the holder comprises a compressing block, the compressing block being sleeved on the connecting rod, and the compressing block being located between the clamping portion and the cam block.

7. The calibration device according to claim 1, wherein the clamping member is sleeved on the vertical rod and being slidable along the vertical rod, and the clamping member clamping the vertical rod to fix the sliding assembly to a required position.

8. The calibration device according to claim 7, wherein the clamping member comprises a first clamping plate, a second clamping plate, and a locking knob;
   the first clamping plate and the second clamping plate being respectively located at two opposite sides of the vertical rod and respectively abutting against the vertical rod; and
   one end of the locking knob penetrating through the first clamping plate, and the locking knob being engaged with the first clamping plate through threads, and when the locking knob is rotated, the locking knob being configured to penetrate through one end of the first clamping plate and abut against the vertical rod, so that the clamping member is fixed to the vertical rod.

9. The calibration device according to claim 8, wherein the clamping member comprises a friction pad) and a pad screw;
   the friction pad being disposed between the first clamping plate and the vertical rod for increasing friction between the first clamping plate and the vertical rod; and
   one end of the pad screw penetrating through the first clamping plate and abutting against the friction pad, and when the pad screw is rotated, a degree of contact between the friction pad and the vertical rod being adjusted to adjust a magnitude of friction between the friction pad and the vertical rod.

10. The calibration device according to claim 1, wherein the self-locking member comprises a fixed rotation shaft, a pressing plate, and an elastic member;

both ends of the fixed rotation shaft being respectively fixed to the clamping member, and a central axis of the fixed rotation shaft being parallel to a rotation axis of the fine adjustment knob;

the pressing plate being sleeved on the fixed rotation shaft and the fine adjustment knob, the pressing plate being configured to rotate around the fixed rotation shaft to drive the fine adjustment knob to move relative to the clamping member, so that the adjusting gear is separated from the rack; and wherein the elastic member is compressed between the pressing plate and the clamping member, to provide recovery elasticity for the pressing plate, so that the adjusting gear compresses the rack.

11. The calibration device according to claim 10, wherein the pressing plate comprises a pressing plate body and a mounting ear;

two mounting ears extending from the pressing plate body, and the pressing plate body being sleeved on the fixed rotation shaft; and the two mounting ears being sleeved on the fine adjustment knob, and the adjusting gear being located between the two mounting ears.

12. The calibration device according to claim 1, wherein the base comprises a base body, a horizontal adjustment member, and a gradienter;

one end of the vertical rod being fixedly mounted to the base body;

the horizontal adjustment member being mounted to the base body to adjust a horizontal angle of the base body; and the gradienter being mounted to the base body for detecting whether the base body is horizontally disposed.

13. The calibration device according to claim 12, wherein the base comprises a supporting member, one end of the supporting member being fixedly mounted to a lower surface of the base body, there being at least one supporting member, wherein one intersection point formed through intersection of one supporting member and the lower surface and two intersection points formed respectively through intersection of the two horizontal adjustment members and the lower surface are respectively located at three vertexes of an isosceles triangle.

14. The calibration device according to claim 12, wherein the horizontal adjustment member comprises a handle and a screw portion;

the handle being fixedly mounted to one end of the screw portion, and the handle being located over the base body to facilitate rotation of the horizontal adjustment member; and the screw portion penetrating through the base body, the screw portion being engaged with the base body through threads, and the screw portion being vertically disposed.

15. The calibration device according to claim 12, wherein the gradienter is mounted to an upper surface of the base body, and the gradienter comprises a first horizontal bead and a second horizontal bead, the first horizontal bead being perpendicular to the second horizontal bead.

16. The calibration device according to claim 12, wherein a first calibration line, a second calibration line, and a third calibration line are disposed on the upper surface of the base body;

the first calibration line and the second calibration line being located on a same straight line; and the third calibration line being perpendicular to the first calibration line and the second calibration line, and a straight line on which the third calibration line is located passing through an intersection point of the vertical rod and the base body.

17. The calibration device according to claim 12, wherein the first calibration line and the third calibration line are disposed on the upper surface of the base body; and wherein the third calibration line is perpendicular to the first calibration line, and a straight line on which the third calibration line is located passes through an intersection point of the vertical rod and the base body.

18. The calibration device according to claim 17, wherein the third calibration line is parallel to a central axis of the accommodating hole, and the third calibration line and the central axis of the accommodating hole are located in a same vertical plane.

19. The calibration device according to claim 1, wherein a height gauge is disposed for the vertical rod for measuring a moving distance or a height of the sliding assembly.

20. An on-board radar calibration device, comprising:
a bracket assembly comprising:
a base;
a vertical rod disposed vertically, one end of the vertical rod being mounted to the base; and
a sliding assembly movably mounted to the vertical rod and movable along the vertical rod, an accommodating hole being disposed on the sliding assembly; and
a laser-corner reflecting apparatus mounted to the sliding assembly, the laser-corner reflecting apparatus being movable relative to the bracket assembly to adjust a height of the laser-corner reflecting apparatus;
wherein the laser-corner reflecting apparatus comprises:
a laser comprising a laser body, the laser body comprising a fixed shaft and a round emitting hole, the fixed shaft being perpendicular to the vertical rod, the fixed shaft being accommodated in the accommodating hole;
a corner reflector mounted to the laser;
wherein the laser is configured to emit a laser to align a position of the corner reflector with that of an on-board radar, the corner reflector being configured to reflect a radar wave emitted by the on-board radar, so that the radar wave returns along an original path to calibrate an installation angle of the on-board radar;
wherein the sliding assembly comprises a holder, the holder comprising a holder body, a clamping portion, a connecting rod, and a handle;
wherein two clamping portions extend from the holder body, an accommodating hole is disposed between the two clamping portions, and there is a gap between the two clamping portions, the gap being in communication with the accommodating hole;
wherein one end of the connecting rod penetrates through one of the clamping portions and is fixed to the other clamping portion, and the other end of the connecting rod is hinged on the handle; and
wherein a cam block and a rotation shaft are disposed on the handle, one end that is of the connecting rod and that is away from the clamping portion is connected to the rotation shaft, two cam blocks are sleeved on both ends of the rotation shaft, and the two cam blocks are rotatable relative to the rotation shaft, to press against the clamping portion, so that the two clamping portions clamp the fixed shaft.

21. The calibration device according to claim 20, wherein the holder comprises a compressing block, the compressing block being sleeved on the connecting rod, and the compressing block being located between the clamping portion and the cam block.

\* \* \* \* \*